(12) United States Patent
Kim et al.

(10) Patent No.: US 12,211,642 B2
(45) Date of Patent: Jan. 28, 2025

(54) SUPERCONDUCTING COIL, METHOD FOR PRODUCING SAME, AND SUPERCONDUCTING RECTANGULAR WIRE FOR SUPERCONDUCTING COIL

(71) Applicant: FURUKAWA ELECTRIC CO., LTD., Tokyo (JP)

(72) Inventors: Yonghoon Kim, Tokyo (JP); Hideki Ii, Tokyo (JP); Takumi Sato, Tokyo (JP); Daisuke Asami, Tokyo (JP); Masahiro Sugimoto, Tokyo (JP); Hirokazu Tsubouchi, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 203 days.

(21) Appl. No.: 17/777,563

(22) PCT Filed: Nov. 18, 2020

(86) PCT No.: PCT/JP2020/043082
§ 371 (c)(1),
(2) Date: May 17, 2022

(87) PCT Pub. No.: WO2021/100789
PCT Pub. Date: May 27, 2021

(65) Prior Publication Data
US 2022/0406504 A1 Dec. 22, 2022

(30) Foreign Application Priority Data
Nov. 18, 2019 (JP) .................................. 2019-208291

(51) Int. Cl.
*H01F 6/06* (2006.01)
*H01F 41/04* (2006.01)

(52) U.S. Cl.
CPC ............. *H01F 6/06* (2013.01); *H01F 41/048* (2013.01)

(58) Field of Classification Search
CPC ............. H01F 5/02; H01F 6/06; H01F 41/048
See application file for complete search history.

(56) References Cited

U.S. PATENT DOCUMENTS

| 5,708,405 A | 1/1998 | Moriyama et al. |
| 2018/0358856 A1 | 12/2018 | Oya et al. |

FOREIGN PATENT DOCUMENTS

| GB | 2294592 A | * 5/1996 | ........... H01F 41/048 |
| JP | 6-084661 A | 3/1994 | |

(Continued)

OTHER PUBLICATIONS

International Search Report mailed on Feb. 16, 2021 in PCT/JP2020/043082 filed on Nov. 18, 2020 (2 pages).

(Continued)

*Primary Examiner* — Jeremy C Norris
(74) *Attorney, Agent, or Firm* — Oblon, McClelland, Maier & Neustadt, L.L.P.

(57) ABSTRACT

The superconducting coil includes: a winding frame; and at least two superconducting rectangular wire layers provided in such a manner that a superconducting rectangular wire is spirally wound on an outer surface of the frame such that wires adjacent to each other in an axial direction of the frame are arranged side by side and separated, the wire including an NbTi-based or $Nb_3Sn$-based wire having a surface coated with copper or copper alloy, in which at least a thermoplastic fusible resin is provided in a separated section between the adjacent wires, and when viewed in a cross section including an axis of the frame, at least one of voids that are partitionable on outer surfaces of a total of three wires and a total of (Continued)

four wires located on the two adjacent layers and adjacent to each other are 4% or less in terms of a void ratio (V1).

20 Claims, 9 Drawing Sheets

(56) References Cited

FOREIGN PATENT DOCUMENTS

| JP | 6-325932 A | | 11/1994 | |
|---|---|---|---|---|
| JP | 8-172013 A | | 7/1996 | |
| JP | 8-316023 A | | 11/1996 | |
| JP | 9-055313 A | | 2/1997 | |
| JP | 9-082147 A | | 3/1997 | |
| JP | 2005019323 A | * | 1/2005 | ............ Y02E 40/60 |
| JP | 2008521220 A | * | 6/2008 | ....... H01L 21/02057 |
| JP | 2010-85873 A | | 4/2010 | |
| KR | 10-2018-0115264 A | | 10/2018 | |

OTHER PUBLICATIONS

Combined Chinese Office Action and Search Report issued Oct. 30, 2023 in Chinese Application No. 202080079788.3, (with unedited computer-generated English translation), 21 pages.

Korean Office Action issued Aug. 5, 2024 in Korean Patent Application No. 10-2022-7018292 (with unedited, machine-generated English translation), 19 pages.

* cited by examiner understand# SUPERCONDUCTING COIL, METHOD FOR PRODUCING SAME, AND SUPERCONDUCTING RECTANGULAR WIRE FOR SUPERCONDUCTING COIL

TECHNICAL FIELD

The present invention relates to a superconducting coil, a method for producing the superconducting coil, and a superconducting rectangular wire for a superconducting coil.

BACKGROUND ART

A superconducting wire that exhibits superconducting performance at extremely low temperature is generally known. Such a superconducting wire can be used as an electromagnet by winding the wire around a winding frame to form a coil and then immersing the coil in liquid helium. The superconducting wire has an advantage of being able to carry an extremely large current compared to an ordinary electric wire such as a copper wire; however, when a large current is passed, a large electromagnetic force is applied, which may cause vibration and generate heat, and when a temperature rises due to heat generation, the superconducting state is disrupted to become a normal conducting state (hereinafter referred to as "quenching") even when a current smaller than a critical current value of the superconducting wire is energized, resulting in causing evaporation of the liquid helium at once, and thus it is required to take measures to maintain the superconducting state and to prevent quenching.

As a means for preventing the quenching, for example, Patent Document 1 discloses a superconducting coil in which a winding portion of the superconducting coil is impregnated with an epoxy resin and then is fixed by curing treatment of the epoxy resin. The cured epoxy resin does not easily cause damages such as crack and peeling even when a heat cycle of normal temperature and extremely low temperature (around 4K) is repeated, but if the damage is caused, the quenching is likely to occur.

Patent Document 1: Japanese Unexamined Patent Application, Publication No. H06-325932

DISCLOSURE OF THE INVENTION

Problems to be Solved by the Invention

However, the fixing of the superconducting rectangular wire by the impregnation treatment and the curing treatment using the epoxy resin described above requires cost and labor, so that a method for producing a superconducting coil capable of preventing the quenching by a simpler manner and a superconducting rectangular wire are desired.

The present invention has been made in view of the above circumstances, and is to provide a superconducting rectangular wire for the purpose of producing a superconducting coil capable of preventing the quenching by a simple method without performing the impregnation treatment and the curing treatment using a resin, a superconducting coil obtained using the superconducting rectangular wire, and a method for producing the same.

Means for Solving the Problems

The inventors have made extensive studies to solve the above-described problems. As a result, the inventors have found a superconducting rectangular wire for a superconducting coil including an NbTi-based or $Nb_3Sn$-based wire having a surface coated with copper or copper alloy and a fusible resin layer made of a thermoplastic fusible resin that coats an outer peripheral surface of the wire, and have completed the present invention capable of efficiently preventing the quenching by optimizing an average coating thickness of the fusible resin layer constituting the superconducting rectangular wire and a radius of curvature at a corner portion of the superconducting rectangular wire and producing a superconducting coil using the superconducting rectangular wire. Specifically, the present invention provides the following.

[1] A superconducting coil includes: a winding frame; and at least two superconducting rectangular wire layers provided in such a manner that a superconducting rectangular wire is spirally wound on an outer peripheral surface of the winding frame in a substantially circumferential direction of the winding frame such that wires adjacent to each other in an axial direction of the winding frame are arranged side by side and separated from each other, the superconducting rectangular wire including an NbTi-based or $Nb_3Sn$-based wire having a surface coated with copper or copper alloy and having a substantially rectangular cross-section, wherein at least a thermoplastic fusible resin is provided in a separated section between the adjacent wires in the same superconducting rectangular wire layer and provided in a separated section between the adjacent wires that are located respectively in the two superconducting rectangular wire layers adjacent to each other, and when viewed in a cross section including an axis of the winding frame, at least one of voids that are partitionable on outer surfaces of a total of three superconducting rectangular wires and are partitionable on outer surfaces of a total of four superconducting rectangular wires located on the two adjacent superconducting rectangular wire layers and adjacent to each other are 4% or less in terms of a void ratio (V1), which is an area ratio of the voids occupying the at least two superconducting rectangular wire layers.

[2] In the superconducting coil according to [1] above, the voids are partitioned on the outer surfaces of a total of three and a total of four superconducting rectangular wires located on the two adjacent superconducting rectangular wire layers and adjacent to each other when viewed in the cross section including the axis of the winding frame.

[3] A superconducting coil includes: a winding frame; and one superconducting rectangular wire layer provided in such a manner that a superconducting rectangular wire is spirally wound on an outer peripheral surface of the winding frame in a substantially circumferential direction of the winding frame such that wires adjacent to each other in an axial direction of the winding frame are arranged side by side and separated from each other, the superconducting rectangular wire including an NbTi-based or $Nb_3Sn$-based wire having a surface coated with copper or copper alloy and having a substantially rectangular cross-section, wherein at least a thermoplastic fusible resin is provided in a separated section between the adjacent wires in the superconducting rectangular wire layer, and when viewed in a cross section including an axis of the winding frame, voids that are partitionable on outer surfaces of a total of two superconducting rectangular wires adjacent to each other are 4% or less in terms of a void ratio (V1), which is an area ratio of the voids occupying the superconducting rectangular wire layer.

[4] In the superconducting coil according to any one of [1] to [3] above, the superconducting rectangular wire includes a fusible resin layer made of the thermoplastic fusible resin that coats an outer peripheral surface of the wire.

[5] In the superconducting coil according to any one of [1] to [4] above, the thermoplastic fusible resin is made of one or more selected from a phenoxy resin, a polyamide resin, and a polyester resin.

[6] In the superconducting coil according to [4] or [5] above, the superconducting rectangular wire further includes an insulating resin layer between the outer peripheral surface of the wire and the fusible resin layer.

[7] In the superconducting coil according to [6] above, the insulating resin layer is made of one or more selected from a polyvinyl formal resin, a polyamide-imide resin, a polyimide resin, a polyester resin, and a polyurethane resin.

[8] In the superconducting coil according to [6] or [7] above, an average coating thickness of the insulating resin layer is 0.005 mm or more and 0.100 mm or less.

[9] In the superconducting coil according to any one of [1] to [8] above, the wire is a rectangular wire, and a radius of curvature (R1) at a corner portion of the wire is 0.1 mm or more and 0.4 mm or less.

[10] In the superconducting coil according to any one of [1] to [9] above, the wire is a rectangular wire, and a radius of curvature (R1) at a corner portion of the wire satisfies Expression (1) and Expression (2) indicated below.

[Math. 1]

$$0 < R1 \leq R1_{max} \quad \text{Expression (1)}$$

$$R1_{max}[\text{mm}] = \sqrt{A \times \frac{(\text{Cross-sectional width of wire}) \times (\text{Cross-sectional thickness of wire})}{4 - \pi}} \quad \text{Expression (2)}$$

A is 0.06 in Expression (2).

[11] A superconducting rectangular wire includes: an NbTi-based or Nb$_3$Sn-based wire having a surface coated with copper or copper alloy; and a fusible resin layer made of a thermoplastic fusible resin that coats an outer peripheral surface of the wire, wherein an average coating thickness of the fusible resin layer is 0.005 mm or more and 0.100 mm or less, and a radius of curvature (R2) at a corner portion of the superconducting rectangular wire satisfies Expression (3) and Expression (4) indicated below.

[Math. 2]

$$0 < R2 \leq R2_{max} \quad \text{Expression (3)}$$

$$R2_{max}[\text{mm}] = \sqrt{B \times \frac{\begin{pmatrix}\text{Cross-sectional width of} \\ \text{superconducting rectangular wire}\end{pmatrix} \times \begin{pmatrix}\text{Cross-sectional thickness} \\ \text{of superconducting rectangular wire}\end{pmatrix}}{4 - \pi}} \quad \text{Expression (4)}$$

B is 3.06 in Expression (4).

[12] In the superconducting rectangular wire according to [11] above, the average coating thickness of the fusible resin layer is 0.01 mm or more and 0.07 mm or less.

[13] In the superconducting rectangular wire according to [11] or [12] above, the thermoplastic fusible resin is made of one or more selected from a phenoxy resin, a polyamide resin, and a polyester resin.

[14] In the superconducting rectangular wire according to any one of [10] to [13] above, the superconducting rectangular wire further includes an insulating resin layer made of an insulating resin between the outer peripheral surface of the wire and the fusible resin layer.

[15] In the superconducting rectangular wire according to [14] above, the insulating resin is made of one or more selected from a polyvinyl formal resin, a polyamide-imide resin, a polyimide resin, a polyester resin, and a polyurethane resin.

[16] In the superconducting rectangular wire according to [14] or [15] above, an average coating thickness of the insulating resin layer is 0.005 mm or more and 0.100 mm or less.

[17] In the superconducting rectangular wire according to any one of [11] to [16] above, the wire is a rectangular wire, and a radius of curvature (R1) at a corner portion of the wire is 0.1 mm or more and 0.4 mm or less.

[18] In the superconducting rectangular wire according to any one of [11] to [17] above, the wire is a rectangular wire, and a radius of curvature (R1) at a corner portion of the wire satisfies Expression (1) and Expression (2) indicated below.

[Math. 3]

$$0 < R1 \leq R1_{max} \quad \text{Expression (1)}$$

$$R1_{max}[\text{mm}] = \sqrt{A \times \frac{(\text{Cross-sectional width of wire}) \times (\text{Cross-sectional thickness of wire})}{4 - \pi}} \quad \text{Expression (2)}$$

A is 0.06 in Expression (2)

[19] A method for producing a superconducting coil includes: a winding process of forming a coil including at least two superconducting rectangular wire layers in which the superconducting rectangular wire according to any one of [10] to [18] above is spirally wound on an outer peripheral surface of a winding frame in a substantially circumferential direction of the winding frame and wires adjacent to each other in an axial direction of the winding frame are arranged side by side and separated from each other; and a heat treatment process of heating, when the thermoplastic fusible resin is an amorphous resin, the coil formed in the winding process to a glass transition temperature or higher of the amorphous resin and 300° C. or lower, or heating, when the thermoplastic fusible resin is a crystalline resin, the coil to a melting point or higher of the crystalline resin and 300° C. or lower.

[20] A method for producing a superconducting coil includes: a winding process of forming a coil including one superconducting rectangular wire layer in which the superconducting rectangular wire according to any one of [10] to [18] above is spirally wound on an outer peripheral surface of a winding frame in a substantially circumferential direction of the winding frame and wires adjacent to each other in an axial direction of the winding frame are arranged side by side and separated from each other; and a heat treatment process of heating, when the thermoplastic fusible resin is an amorphous resin, the coil formed in the winding process to a glass transition temperature or higher of the amorphous resin and 300° C. or lower, or heating, when the thermoplastic fusible resin is a crystalline resin, the coil to a melting point or higher of the crystalline resin and 300° C. or lower.

Effects of the Invention

According to the present invention, it is possible to provide a superconducting rectangular wire for the purpose of producing a superconducting coil capable of preventing the quenching by a simple method without performing the impregnation treatment and the curing treatment using a resin, a superconducting coil obtained using the superconducting rectangular wire, and a method for producing the same.

PREFERRED MODE FOR CARRYING OUT THE INVENTION

Preferred embodiments of the present invention will be described in detail below, but the present invention is not limited to the following embodiments.

1. Superconducting Coil

A superconducting coil according to the present invention includes: a winding frame; and at least two superconducting rectangular wire layers provided in such a manner that a superconducting rectangular wire is spirally wound on an outer peripheral surface of the winding frame in a substantially circumferential direction of the winding frame such that wires adjacent to each other in an axial direction of the winding frame are arranged side by side and separated from each other, the superconducting rectangular wire including an NbTi-based or $Nb_3Sn$-based wire having a surface coated with copper or copper alloy and having a substantially rectangular cross-section, in which at least a thermoplastic fusible resin is provided in a separated section between the adjacent wires in the same superconducting rectangular wire layer and provided in a separated section between the adjacent wires that are located respectively in the two superconducting rectangular wire layers adjacent to each other, and when viewed in a cross section including an axis of the winding frame, at least one of voids that are partitionable on outer surfaces of a total of three superconducting rectangular wires and are partitionable on outer surfaces of a total of four superconducting rectangular wires located on the two adjacent superconducting rectangular wire layers and adjacent to each other are 4% or less in terms of a void ratio (V1), which is an area ratio of the voids occupying the at least two superconducting rectangular wire layers.

A superconducting coil according to the present invention includes: a winding frame; and one superconducting rectangular wire layer provided in such a manner that a superconducting rectangular wire is spirally wound on an outer peripheral surface of the winding frame in a substantially circumferential direction of the winding frame such that wires adjacent to each other in an axial direction of the winding frame are arranged side by side and separated from each other, the superconducting rectangular wire including an NbTi-based or $Nb_3Sn$-based wire having a surface coated with copper or copper alloy and having a substantially rectangular cross-section, in which at least a thermoplastic fusible resin is provided in a separated section between the adjacent wires in the superconducting rectangular wire layer, and when viewed in a cross section including an axis of the winding frame, voids that are partitionable on outer surfaces of a total of two superconducting rectangular wires adjacent to each other are 4% or less in terms of a void ratio (VI), which is an area ratio of the voids occupying the superconducting rectangular wire layer.

Figure 1:
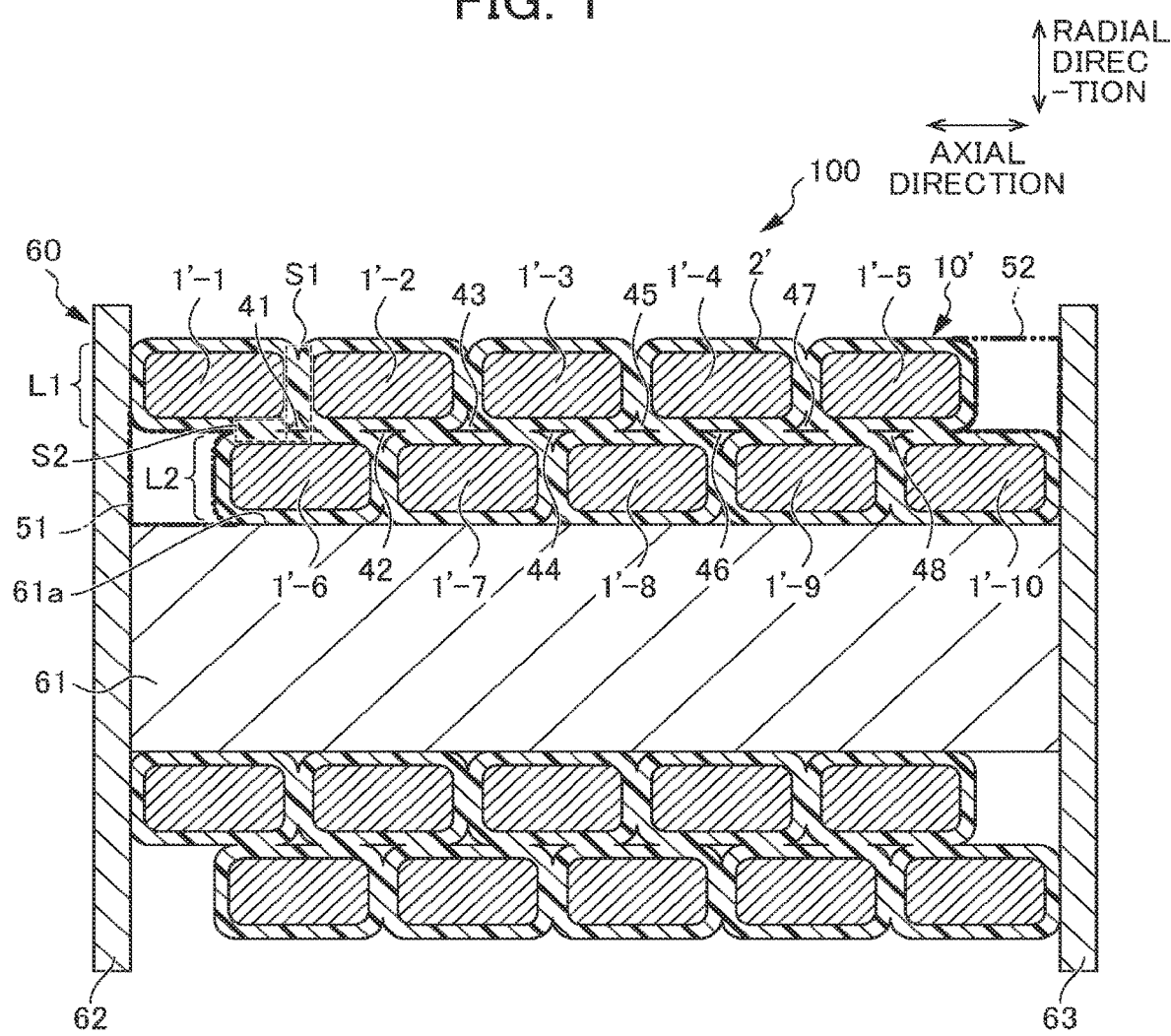
FIG. 1 is a cross-sectional view of a superconducting coil of a first embodiment cut in a plane including an axis of a winding frame.

FIG. 1 is a cross-sectional view of a superconducting coil of a first embodiment cut in a plane including an axis of a winding frame. A superconducting coil 100 shown in FIG. 1 includes: a winding frame 60; and two superconducting rectangular wire layers L1 and L2 provided in such a manner that a superconducting rectangular wire 10' is spirally wound on an outer peripheral surface of the winding frame 60 in a substantially circumferential direction of the winding frame 60 such that wires 1' adjacent to each other in an axial direction of the winding frame are arranged side by side and separated from each other, the superconducting rectangular wire 10' including an NbTi-based or $Nb_3Sn$-based wire 1' having a surface coated with copper or copper alloy and having a substantially rectangular cross-section. The superconducting rectangular wire layers L1 and L2 are laminated in a radial direction of the winding frame 60. The superconducting rectangular wire layer L1 is provided outside the superconducting rectangular wire layer L2, and the superconducting rectangular wire layer L2 is provided inside the superconducting rectangular wire layer L1 and provided on the outer peripheral surface of the winding frame 60. Hereinafter, an example will be described in which the superconducting coil 100 includes the two superconducting rectangular wire layers L1 and L2, but the superconducting coil 100 may include three or more superconducting rectangular wire layers.

The winding frame 60 includes, for example, a solid or hollow cylindrical barrel portion 61 and flange-like brim portions 62 and 63 provided at both ends in an axial direction of the barrel portion 61. The wire 1' is wound on an outer peripheral surface of the barrel portion 61 of the winding frame 60. In the cross-sectional view of the superconducting coil cut in a plane including the axis of the winding frame as shown in FIG. 1, that is, a longitudinal cross-sectional view including the axis of the winding frame, the outer peripheral surface of the barrel portion 61 corresponds to an outer peripheral line 61a to be described below.

At least a thermoplastic fusible resin 2' is provided in a separated section S1 between the wires 1'-1 and 1'-2 adjacent to each other in the axial direction of the winding frame in the same superconducting rectangular wire layer L1 or L2 and provided in a separated section S2 between the wires 1'-1 and 1'-6 that are located respectively in the two superconducting rectangular wire layers L1 and L2 adjacent to each other in the radial direction of the winding frame and are adjacent to each other in the radial direction of the winding frame. In other words, the surface of the wire 1' is completely covered with the thermoplastic fusible resin 2', and the wires 1' do not come into contact with each other. Then, when viewed in the cross section including the axis of the winding frame 60, at least one of voids that can be partitioned on outer surfaces of a total of three superconducting rectangular wires and voids that can be partitioned on outer surfaces of a total of four superconducting rectangular wires located on the two adjacent superconducting rectangular wire layers and adjacent to each other in the axial direction or the radial direction of the winding frame are 4% or less in terms of a void ratio (V1), which is an area ratio of the voids occupying the two superconducting rectangular wire layers L1 and L2.

Figure 4:
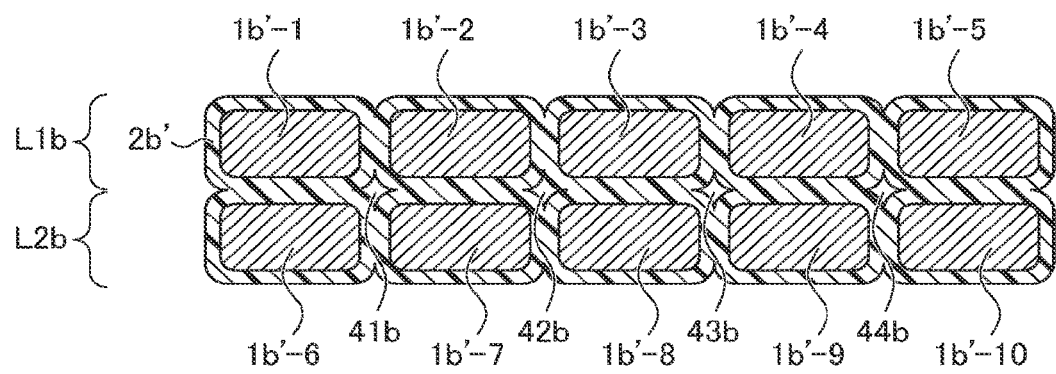
FIG. 4 is a cross-sectional view illustrating an arrangement relation of two adjacent superconducting rectangular wire layers constituting a superconducting coil of a third embodiment.

As shown in FIG. 1, the voids that can be partitioned on the outer surfaces of the total of three superconducting rectangular wires include a void 41 that can be partitioned on outer surfaces of a total of three superconducting rectangular wires 1'-1, 1'-2, and 1'-6, a void 42 that can be partitioned on outer surfaces of the total of three superconducting rectangular wires 1'-2, 1'-6, and 1'-7, . . . , and a void 48. Further, as shown in FIG. 4 to be described below, the voids that can be partitioned on the outer surfaces of the total of four superconducting rectangular wires include a void 41b that can be partitioned on outer surfaces of a total of four superconducting rectangular wires 1b'-1, 1b'-2, 1b'-6, and 1b'-7, a void 42b that can be partitioned on outer surfaces of a total of four superconducting rectangular wires 1'-2, 1b'-3, 1'-7, and 1'-8, . . . , and a void 44b.

When viewed in the cross section including the axis of the winding frame 60, the voids may be only voids that can be partitioned on the outer surfaces of the total of three superconducting rectangular wires, may be only voids that can be partitioned on the outer surfaces of the total of four superconducting rectangular wires, or may be voids (mixed voids) that can be partitioned on the outer surfaces of the total of three and the total of four superconducting rectangular wires. Further, in the superconducting coil 100, when an angle of a plane including the axis of the winding frame 60 is different with respect to the axis of the winding frame 60, the state of the voids in the cross section including the axis of the winding frame 60 may change. For example, in the superconducting coil 100, only the voids that can be partitioned on the outer surfaces of the total of three superconducting rectangular wires are seen in the cross section including the axis of the winding frame 60, and only the voids that can be partitioned on the outer surfaces of the total of four superconducting rectangular wires may be seen in another cross section including the axis of the winding frame 60.

Figure 2:
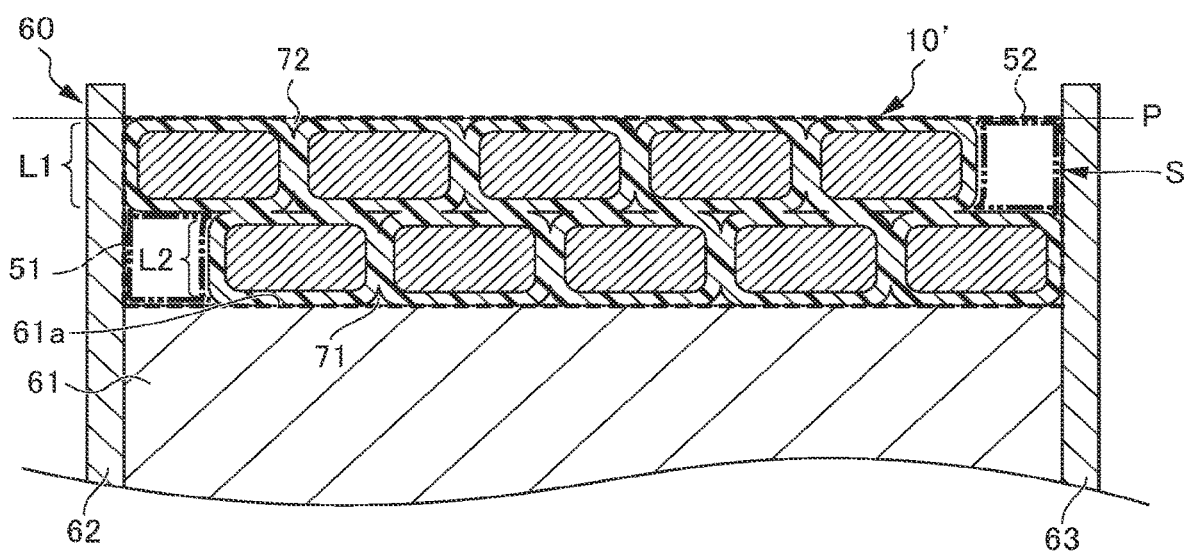
FIG. 2 is a view illustrating a method of calculating a void ratio (V1) in the superconducting coil of FIG. 1.

Here, in order to calculate of the void ratio (V1), a method of calculating an area (S) of at least two superconducting rectangular wire layers will be described. As shown in FIG. 2, when viewed in the cross section including the axis of the winding frame, a line P is defined as a line farthest from the outer peripheral line 61a among straight lines tangent to or intersecting with all of the superconducting rectangular wires 10' constituting the outermost superconducting rectangular wire layer L1. As shown in FIG. 2, for example, the line P is a line parallel to the outer peripheral line 61a and tangent to all of the superconducting rectangular wires 10' constituting the superconducting rectangular wire layer L1. A region surrounded by the line P, the outer peripheral line 61a of the barrel portion 61 of the winding frame 60, and the brim portions 62 and 63 of the winding frame 60 is defined as the area (S) (a region indicated by a dotted line in FIG. 2). On the other hand, an area ($S_v$) of the voids is the sum of the voids 41, 42, . . . , and 48 shown in FIG. 1 and the voids 41b, 42b, . . . , and 48b shown in FIG. 4 as described above. Voids 51 and 52 (indicated as regions surrounded by a two-dot chain line, respectively, in FIG. 1) formed between both the brim portions 62 and 63 of the winding frame 60 and both side surfaces of both the superconducting rectangular wire layers L1 and L2 facing both the brim portions 62 and 63 are not added to the area ($S_v$) of the voids, and all inner side voids 71 formed between the superconducting rectangular wire layer L2 and the outer peripheral line 61a of the barrel portion of the winding frame and all outer side voids 72 formed between the outermost superconducting rectangular wire layer L1 and the line P are added to the area ($S_v$) of the voids. Then, the void ratio (V1) is obtained by $V1(\%) = (S_v/S) \times 100$. From the viewpoint of preventing the quenching, the voids 51 and 52 are preferably filled with a resin such as a thermoplastic fusible resin.

According to such a superconducting coil 100, the quenching can be efficiently prevented even when a large current is passed through the superconducting coil 100, and it can be used as a superconducting coil in which cracks do not occur in the thermoplastic fusible resin 2' due to thermal stress generated at the time of repetitive temperature rise and decrease of the coil or at the time of the quenching, the number of training quenches is small, and stability is high.

[Superconducting Rectangular Wire]

The superconducting rectangular wire 10' includes at least a wire 1' to be described below and a fusible resin layer 2' made of a thermoplastic fusible resin that coats the outer peripheral surface of the wire 1', and may further include an insulating resin that is arbitrarily provided therebetween.

In the superconducting coil 100, a direction of the superconducting rectangular wire 10' to be wound around the winding frame 60 is not particularly limited, and may be a clockwise direction and a counterclockwise direction.

The number of the superconducting rectangular wire 10' to be wound around the winding frame 60 is also not particularly limited.

The number of superconducting rectangular wire layer with respect to the winding frame 60 is not particularly limited as long as being at least a single layer.

[Wire]

The wire 1' is an NbTi-based or $Nb_3Sn$-based wire having a surface coated with copper or a copper alloy.

A shape of the wire 1' is not particularly limited, and for example, a circular wire or a rectangular wire can be used. When the rectangular wire is used, the voids can be made smaller and a larger current density can be obtained. Further, when the wire is produced by a producing method to be described below, since a fusion area (contact area) between the wires becomes large, a fusion force can be increased.

When the rectangular wire is used as the wire 1', a radius of curvature (R1) at a corner portion in a transverse section (that is, corresponding to the cross section including the axis of the winding frame of the superconducting coil) is preferably 0.1 mm or more and 0.4 mm or less. When the superconducting coil is wound in a state where the radius of curvature (R1) at the corner portion is set to 0.1 mm or more, it is possible to prevent the wire from getting caught between the wires and causing scratches on the surface of the wire, and when the radius of curvature (R1) at the corner portion is set to 0.4 mm or less, it is possible to reduce the void ratio in the superconducting coil.

When the rectangular wire is used as the wire 1', a thickness (short side) in the transverse section of the wire 1' is not particularly limited, but is 0.2 mm or more and 3 mm or less, for example. Further, a width (long side) of the wire is not particularly limited, but is 0.4 mm or more and 10 mm or less, for example.

When the rectangular wire is used as the wire 1', the radius of curvature (R1) at the corner portion of the wire 1' preferably satisfies Expression (1) and Expression (2) below. In Expression (2), A is 0.06, and is preferably 0.04.

[Math. 4]

$$0 < R1 \leq R1_{max} \quad \text{Expression (1)}$$

$$R1_{max}[\text{mm}] = \sqrt{A \times \frac{(\text{Cross-sectional width of wire}) \times (\text{Cross-sectional thickness of wire})}{4 - \pi}} \quad \text{Expression (2)}$$

[Fusible Resin Layer]

The fusible resin layer 2' is made of a thermoplastic fusible resin that coats the outer peripheral surface of the wire 1', and can be fused to each other by heating.

The thermoplastic fusible resin is not particularly limited, but preferably includes one or more selected from a phenoxy resin, a polyamide resin, and a polyester resin, which can be fused under a relatively low-temperature condition and can be expected to have excellent fusion characteristics.

The phenoxy resin described above is also called polyhydroxy ether and has a molecular weight of 10,000 or more, and a chemical structure formula of the phenoxy resin is represented below as Formula (a). Although not particularly limited, the phenoxy resin used in the present invention can be used as a varnish dissolved in a solvent such as m-cresol.

[Chemical formula 1]

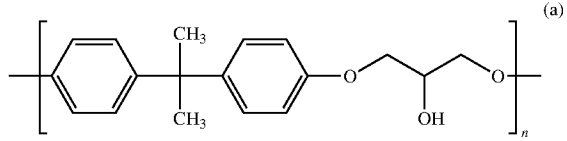

As the above-described polyamide resin, a polyamide random copolymer having a relatively lower melting point than a simple polyamide substance is preferably used, and examples of the polyamide resin include a polyamide 6/polyamide 12 copolymer, a polyamide 6/polyamide 11 copolymer, and a polyamide 6/polyamide 66 copolymer, and more preferably include a polyamide 6/polyamide 12 copolymer and a polyamide 6/polyamide 11 copolymer because of having a lower melting point. A melting point of the polyamide copolymer varies depending on a composition ratio of each resin, and the composition ratio having the lowest melting point can be selected and used. For example, the polyamide 6/polyamide 11 copolymer has the lowest melting point of 150° C. when the polyamide 6 is 30 weight %. Although not particularly limited, the polyamide resin used in the present invention can be used as a varnish dissolved in a solvent such as m-cresol.

[Insulating Resin Layer]

Although not an essential component, it is preferable to further include an insulating resin layer made of an insulating resin between the outer peripheral surface of the wire and the fusible resin layer in order to further enhance an insulating property from the wire to the outside.

Figure 3:
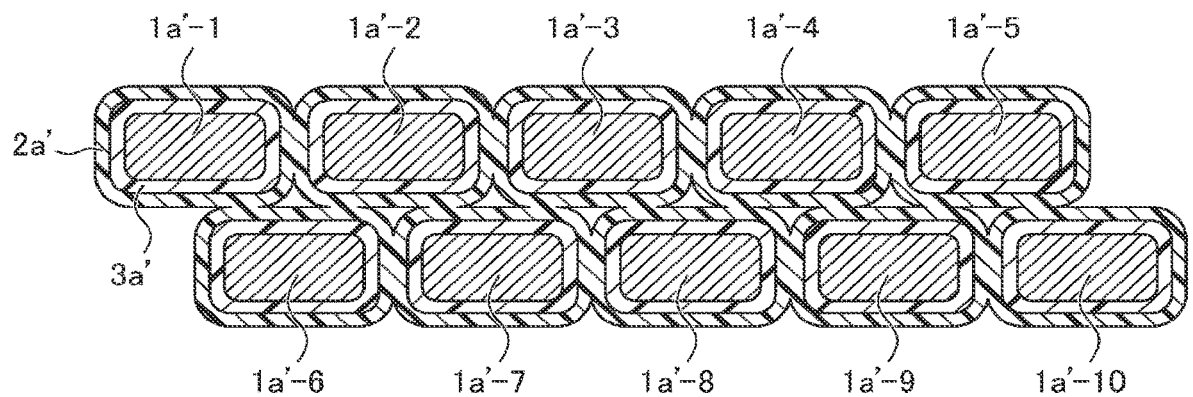
FIG. 3 is a cross-sectional view illustrating an arrangement relation of two adjacent superconducting rectangular wire layers constituting a superconducting coil of a second embodiment.

FIG. 3 is a cross-sectional view of a superconducting rectangular wire layer portion of a superconducting coil of a second embodiment. FIG. 3 shows only a cross-section view of the superconducting rectangular wire layer portion on one side when viewed in a cross section including an axis of a winding frame, wherein the winding frame is omitted. A fusible resin layer 2 *a'* is fused and bonded. Then, the insulating resin layer 3*a* is provided between the outer peripheral surface of the wire 1*a'*-1 and the fusible resin layer 2*a'*. The surface of the wire 1 *a'* is completely covered with the insulating resin layer 3*a*.

The insulating resin is not particularly limited as long as being capable of insulating a flow of electricity from the wire 1*a'*-1 to the outside. The insulating resin layer is preferably made of one or more selected from a polyvinyl formal resin, a polyamide-imide resin, a polyimide resin, a polyester resin, and a polyurethane resin, which can be expected to have relatively excellent insulating properties.

An average coating thickness of the insulating resin layer 3*a* is not particularly limited, but is preferably 0.005 mm or more, and more preferably 0.01 mm or more in order to secure insulating characteristics. Further, the average coating thickness of the insulating resin layer 3*a* is preferably 0.100 mm or less, more preferably 0.07 mm or less, and still more preferably 0.05 mm or less. When the average coating thickness of the insulating resin layer is less than 0.005 mm, sufficient insulating characteristics cannot be expected due to the insufficient amount of resin, and when the average coating thickness of the insulating resin layer is thicker than 0.100 mm, a space factor of the wire decreases and a current density of the coil decreased, which is not preferable. The average coating thickness of the insulating resin layer 3*a* is measured at the end of the cross section (a portion not sandwiched between the wires) when cut in a plane including the axis of the winding frame 60.

By the way, as shown in FIGS. 1 and 3, in the superconducting coil in which the void 41 is partitioned on the outer surfaces of a total of three superconducting rectangular wires (for example, the superconducting rectangular wires of the wire 1'-1, 1'-2, and 1'-6) located in the two adjacent superconducting rectangular wire layers L1 and L2 and adjacent to each other when viewed in the cross section including the axis of the winding frame, as compared with the superconducting coil (FIG. 4) in which the void is partitioned on the outer surfaces of a total of four superconducting rectangular wires, the voids 41, 42, ..., and 48 are not aligned linearly in the radial direction of the winding frame and these voids are alternately arranged shifted inward and outward in the radial direction of the winding frame. In the superconducting coil shown in FIGS. 1 and 3 as described above, the positions of the superconducting rectangular wire 10' and the corner portions of the wire 1' constituting the superconducting rectangular wire layer L1 does not match in the axial direction of the winding frame and completely deviates from the positions of the superconducting rectangular wire 10' and the corner portions of the wire 1' constituting the superconducting rectangular wire layer L2, which is adjacent to the inside in the radial direction of the winding frame of the superconducting rectangular wire layer L1. Therefore, the growth of cracks between the voids is efficiently prevented, and mechanical strength is increased.

However, as shown in FIG. 4, when the void 41b is partitioned on the outer surfaces of a total of four superconducting rectangular wires (for example, the superconducting rectangular wires of wire 1b'-1, 1b'-2, 1b'-6, and 1b'-7) located in the two adjacent superconducting rectangular wire layers L1b and L2b and adjacent to each other when viewed in the cross section including the axis of the winding frame, the voids 41b, 42b, 43b, and 44b are aligned linearly in the radial direction of the winding frame, but the configuration has strength sufficient to withstand normal use of the superconducting coil.

Figure 5:
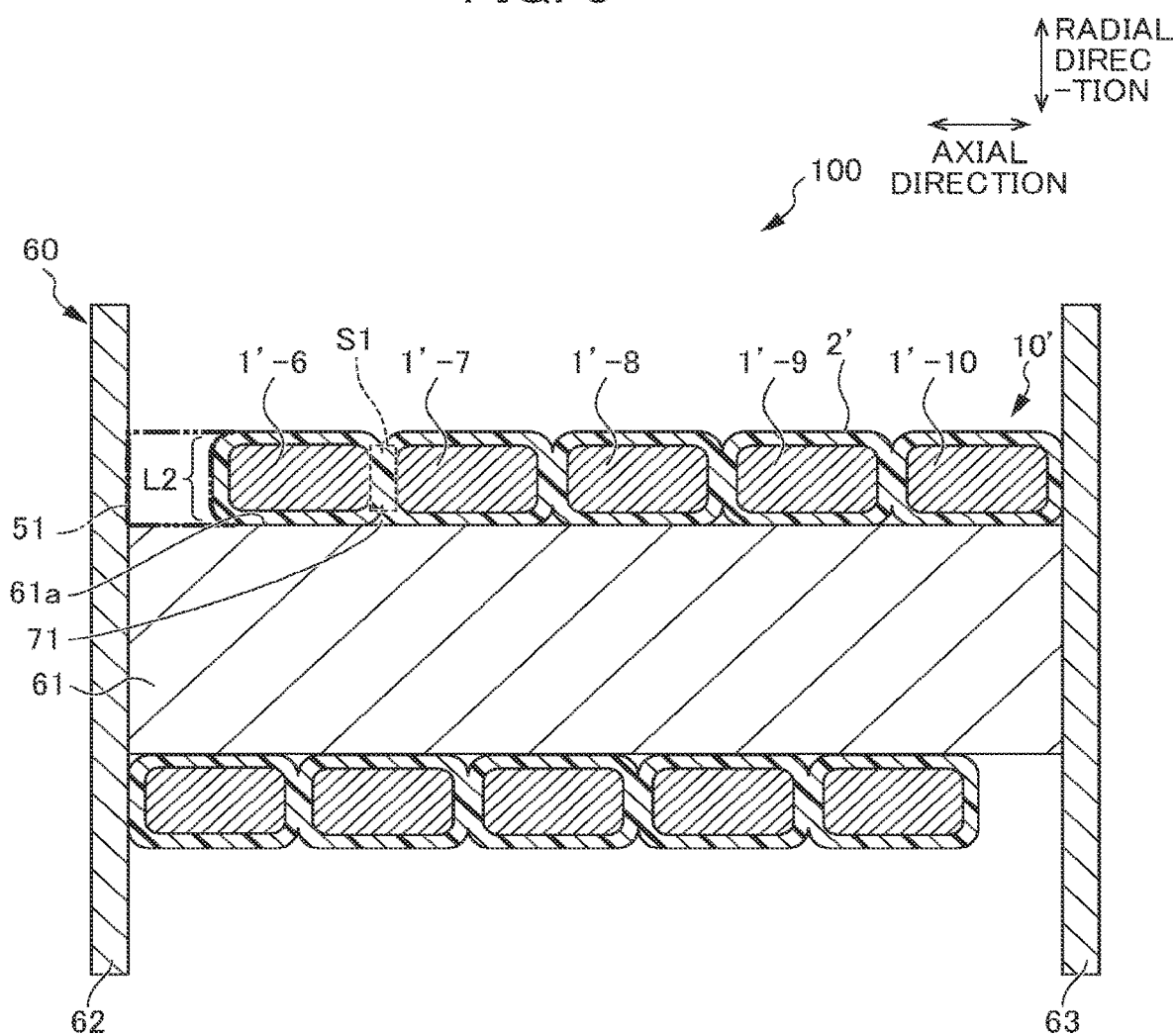
FIG. 5 is a cross-sectional view of a superconducting coil of a fourth embodiment cut in a plane including an axis of a winding frame.
Figure 6:
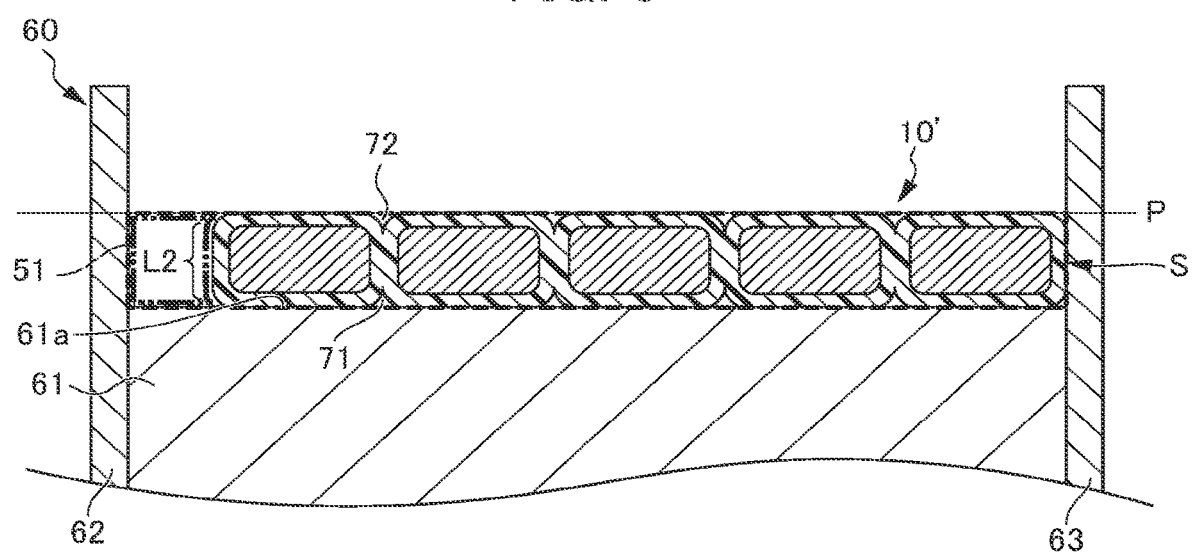
FIG. 6 is a view illustrating a method of calculating a void ratio (V1) in the superconducting coil of FIG. 5.

FIG. 5 is a cross section of a superconducting coil of a fourth embodiment when the superconducting coil is cut along a plane including an axis of a winding frame. FIG. 6 is a view illustrating a method of calculating a void ratio (V1) in the superconducting coil shown in FIG. 5. The superconducting coil has been described above which includes at least the two superconducting rectangular wire layers L1 and L2 (or, L1b and L2b) on the outer peripheral line 61a of the barrel portion 61 of the winding frame 60, but a superconducting coil 100 of the present embodiment includes only one superconducting rectangular wire layer L2 on the outer peripheral line 61a of the barrel portion 61. Further, similarly to the above, the superconducting coil 100 shown in FIGS. 5 and 6 may include an insulating resin layer 3a.

The superconducting coil 100 shown in FIGS. 5 and 6 includes: a winding frame 60; and only one superconducting rectangular wire layer L2 provided in such a manner that a superconducting rectangular wire 10' is spirally wound on an outer peripheral surface of the winding frame 60 in a substantially circumferential direction of the winding frame 60 such that the wires 1' adjacent to each other in an axial direction of the winding frame 60 are arranged side by side and separated from each other, the superconducting rectangular wire 10' including an NbTi-based or Nb₃Sn-based wire 1' having a surface coated with copper or copper alloy and having a substantially rectangular cross-section. The superconducting rectangular wire layer L2 is provided on the outer peripheral surface of the winding frame 60.

At least a thermoplastic fusible resin 2' is provided in a separated section S1 between the wires 1'-6 and 1'-7 adjacent to each other in the axial direction of the winding frame in the superconducting rectangular wire layer L2. In other words, the surface of the wire 1' is completely covered with the thermoplastic fusible resin 2', and the wires 1' do not come into contact with each other. Then, when viewed in the cross section including the axis of the winding frame 60, voids that can be partitioned on outer surfaces of a total of two superconducting rectangular wires adjacent to each other in the axial direction of the winding frame are 4% or less in terms of a void ratio (V1), which is an area ratio of the voids occupying the one superconducting rectangular wire layer L2.

Here, in order to calculate of the void ratio (V1), a method of calculating an area (S) of one superconducting rectangular wire layer will be described. As shown in FIG. 6, when viewed in the cross section including the axis of the winding frame, a line P is defined as a line farthest from the outer peripheral line 61a among straight lines tangent to or intersecting with all of the superconducting rectangular wires 10' constituting the superconducting rectangular wire layer L2. As shown in FIG. 6, for example, the line P is a line parallel to the outer peripheral line 61a and tangent to all of the superconducting rectangular wires 10' constituting the superconducting rectangular wire layer L2. A region surrounded by the line P, the outer peripheral line 61a of the barrel portion 61 of the winding frame 60, and the brim portions 62 and 63 of the winding frame 60 is defined as the area (S) (a region indicated by a dotted line in FIG. 6). On the other hand, an area ($S_v$) of the voids is the sum of all the inner side voids 71 formed between the superconducting rectangular wire layer L2 and the outer peripheral line 61a of the barrel portion of the winding frame and all the outer side voids 72 formed between the superconducting rectangular wire layer L2 and the line P. A void 51 (here, indicating a configuration in which the void 51 is formed between the brim portion 62 and the side surface of the superconducting rectangular wire layer L2, and is not formed between the brim portion 63 and the side surface of the superconducting rectangular wire layer L2) formed between both the brim portions 62 and 63 of the winding frame 60 and both side surfaces of the superconducting rectangular wire layer L2 facing both the brim portions 62 and 63 is not added to the area ($S_v$) of the voids. Then, the void ratio (V1) is obtained by $V1(\%) = (S_v/S) \times 100$. From the viewpoint of preventing the quenching, the void 51 is preferably filled with a resin such as a thermoplastic fusible resin.

According to such a one-layer type superconducting coil 100, similarly to the above-described multi-layer type superconducting coil, the quenching can be efficiently prevented even when a large current is passed through the superconducting coil 100, and it can be used as a superconducting coil in which cracks do not occur in the thermoplastic fusible resin 2' due to thermal stress generated at the time of repetitive temperature rise and decrease of the coil or at the time of the quenching, the number of training quenches is small, and stability is high.

2. Superconducting Rectangular Wire for Superconducting Coil

The superconducting rectangular wire for the superconducting coil of the present invention is a superconducting rectangular wire for a superconducting coil including an NbTi-based or Nb₃Sn-based wire having a surface coated with copper or a copper alloy and a fusible resin layer made of a thermoplastic fusible resin that coats an outer peripheral surface of the wire, in which an average coating thickness of the fusible resin layer is 0.005 mm or more and 0.100 mm or less, and a radius of curvature (R2) at a corner portion of the superconducting rectangular wire satisfies Expression (3) and Expression (4) indicated below. In Expression (3), B is 0.06, and is preferably 0.04.

[Math. 5]

$$0 < R2 \leq R2_{max} \quad \text{Expression (3)}$$

$$R2_{max}[\text{mm}] = \sqrt{B \times \frac{(\text{Cross-sectional width of superconducting rectangular wire}) \times (\text{Cross-sectional thickness of superconducting rectangular wire})}{4 - \pi}} \quad \text{Expression (4)}$$

Figure 7:
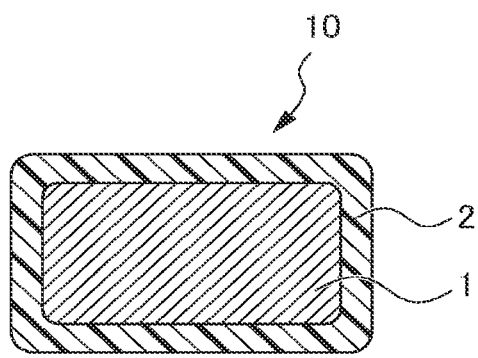
FIG. 7 is a transverse sectional view of a superconducting rectangular wire for the superconducting coil according to the first embodiment.

FIG. 7 is a transverse section view of the superconducting rectangular wire for the superconducting coil according to the first embodiment of the present invention. The superconducting rectangular wire 10 for the superconducting coil includes the NbTi-based or Nb₃Sn-based wire 1 having a surface coated with the copper or the copper alloy and the fusible resin layer 2 made of the thermoplastic fusible resin that coats the outer peripheral surface of the wire 1, the average coating thickness of the fusible resin layer 2 is 0.005 mm or more and 0.100 mm or less, and the radius of curvature (R2) at the corner portion of the superconducting rectangular wire 10 satisfies Expression (3) and Expression (4) above. The transverse section of the superconducting rectangular wire 10 is a substantially rectangular flat wire.

Through a simple method including: a winding process of forming a coil including at least two superconducting rectangular wire layers in which such a superconducting rectangular wire 10 is spirally wound on the outer peripheral surface of the winding frame in a substantially circumferential direction of the winding frame and the wires 1 and 1 adjacent to each other in the axial direction of the winding frame are arranged side by side and separated from each other; and a heat treatment process of heating the coil formed in the winding process to a glass transition temperature or higher of an amorphous resin (preferably, a temperature being 30° C. higher than the glass transition temperature) and 300° C. or lower when the thermoplastic fusible resin is an amorphous resin, or heating the coil to a melting point or higher of a crystalline resin and 300° C. or lower when the thermoplastic fusible resin is a crystalline resin, it is possible to produce the superconducting coil 100 capable of preventing the quenching with a simple operation without impregnation and curing using a resin, based on the fact that the superconducting rectangular wire 10 is coated in advance with the fusible resin layer 2 on the outer peripheral surface of the wire 1. When a fusion treatment temperature exceeds 300° C., the performance of the superconducting wire may deteriorate due to heating, which is not preferable.

In particular, when the average coating thickness of the fusible resin layer 2 is 0.005 mm or more and 0.100 mm or less and the radius of curvature (R2) at the corner portion of the superconducting rectangular wire 10 satisfies Expression (3) and Expression (4) above, the void ratio (V1) of the superconducting coil produced using the superconducting rectangular wire 10 becomes 4% or less, and as a result, the quenching of the superconducting coil 100 can be prevented.

[Wire]

The wire 1 is the same as the wire used for the superconducting coil described above, and thus will not be described here.

[Fusible Resin Layer]

The fusible resin layer 2 is a layer made of the same resin as the thermoplastic fusible resin used for the superconducting coil described above, and coats the outer peripheral surface of the wire 1.

Specifically, the thermoplastic fusible resin constituting the fusible resin layer 2 is not particularly limited, but preferably includes one or more selected from a phenoxy resin, a polyamide resin, and a polyester resin, which can be fused under a relatively low-temperature condition and can be expected to have excellent fusion characteristics.

The average coating thickness of the fusible resin layer 2 is not particularly limited as long as being 0.005 mm or more and 0.100 mm or less, and is preferably 0.01 mm or more. Further, the average coating thickness of the fusible resin layer 2 is preferably 0.07 mm or less, and more preferably 0.05 mm or less. When the average coating thickness of the fusible resin layer 2 is less than 0.005 mm, a sufficient fusion force cannot be expected due to the insufficient amount of resin, and on the other hand, when the average coating thickness of the fusible resin layer 2 is thicker than 0.100 mm, a space factor of the wire decreases and a current density of the coil decreases, which is not preferable. The average coating thickness of the fusible resin layer 2 when the superconducting coil 100 is configured is measured at the end of the cross section (a portion not sandwiched between the wires) when cut in a plane including the axis of the winding frame 60.

[Insulating Resin Layer]

Although not an essential component, it is preferable to further include an insulating resin layer made of an insulating resin between the outer peripheral surface of the wire and the fusible resin layer in order to further enhance the insulating property from the wire to the outside.

Figure 8:
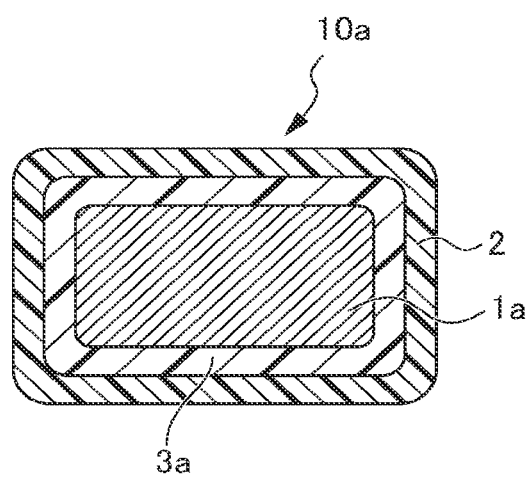
FIG. 8 is a transverse sectional view of a superconducting rectangular wire for the superconducting coil according to the second embodiment.

FIG. 8 is a transverse section of the superconducting rectangular wire for the superconducting coil according to the second embodiment of the present invention. In FIG. 8, the superconducting rectangular wire 10a further includes the insulating resin layer 3a between the outer peripheral surface of the wire 1a and the fusible resin layer 2a.

The insulating resin layer 3a is not particularly limited as long as being capable of insulating a flow of electricity from the wire 1a to the outside. The insulating resin layer 3a is preferably made of one or more selected from a polyvinyl formal resin, a polyamide-imide resin, a polyimide resin, a polyester resin, and a polyurethane resin, from the viewpoint that relatively excellent insulating properties can be expected.

An average coating thickness of the insulating resin layer 3a is not particularly limited, and is preferably 0.005 mm or more, and more preferably 0.01 mm or more in order to secure insulating characteristics. Further, the average coating thickness of the insulating resin layer 3a is preferably 0.100 mm or less, more preferably 0.07 mm or less, and still more preferably 0.05 mm or less. When the average coating thickness of the insulating resin layer is less than 0.005 mm, sufficient insulating characteristics cannot be expected due to the insufficient amount of resin, and when the average coating thickness of the insulating resin layer is thicker than 0.100 mm, a space factor of the wire decreases and a current density of the coil decreases, which is not preferable. The average coating thickness of the insulating resin layer 3a when the superconducting coil 100 is configured is measured at the end of the cross section (a portion not sandwiched between the wires) when cut in a plane including the axis of the winding frame 60.

[Production of Superconducting Rectangular Wire for Superconducting Coil]

An example of the method of coating the superconducting rectangular wire for the superconducting coil with the fusible resin layer as described above includes a method of coating by a resin baking process with a varnish, in which the thermoplastic fusible resin is dissolved in a solvent, without being particularly limited, and an example of the method of coating the superconducting rectangular wire with the insulating resin layer includes a method of coating by a resin baking process with a varnish, in which the insulating resin is dissolved in a solvent, without being particularly limited.

As another effect in using the superconducting rectangular wire as described above, when the superconducting rectangular wire is used to produce a deformed coil such as a saddle type coil in addition to a solenoid coil, an effect can be obtained in which the superconducting rectangular wires are locally brought into contact with each other and temporarily fastened by heating the contacted part in the middle of coil production so as not to loosen the tension of the winding, whereby winding workability is improved.

3. Method for Producing Superconducting Coil

A method for producing the superconducting coil of the present invention includes: a winding process of forming a coil including at least two superconducting rectangular wire layers in which such a superconducting rectangular wire 10 described above is spirally wound on the outer peripheral surface of the winding frame 60 in a substantially circumferential direction of the winding frame 60 and the wires 1 adjacent to each other in the axial direction of the winding frame 60 are arranged side by side and separated from each other; and a heat treatment process of heating the coil formed in the winding process to a glass transition temperature or higher of an amorphous resin (preferably, a temperature being 30° C. higher than the glass transition temperature) and 300° C. or lower when the thermoplastic fusible resin is an amorphous resin, or heating the coil to a melting point or higher of a crystalline resin and 300° C. or lower when the thermoplastic fusible resin is a crystalline resin. Through such a simple method, it is possible to produce the superconducting coil 100 capable of preventing the quenching without impregnation and curing using a resin. Examples of the amorphous resin include a phenoxy resin and a polyester resin.

Figure 9:
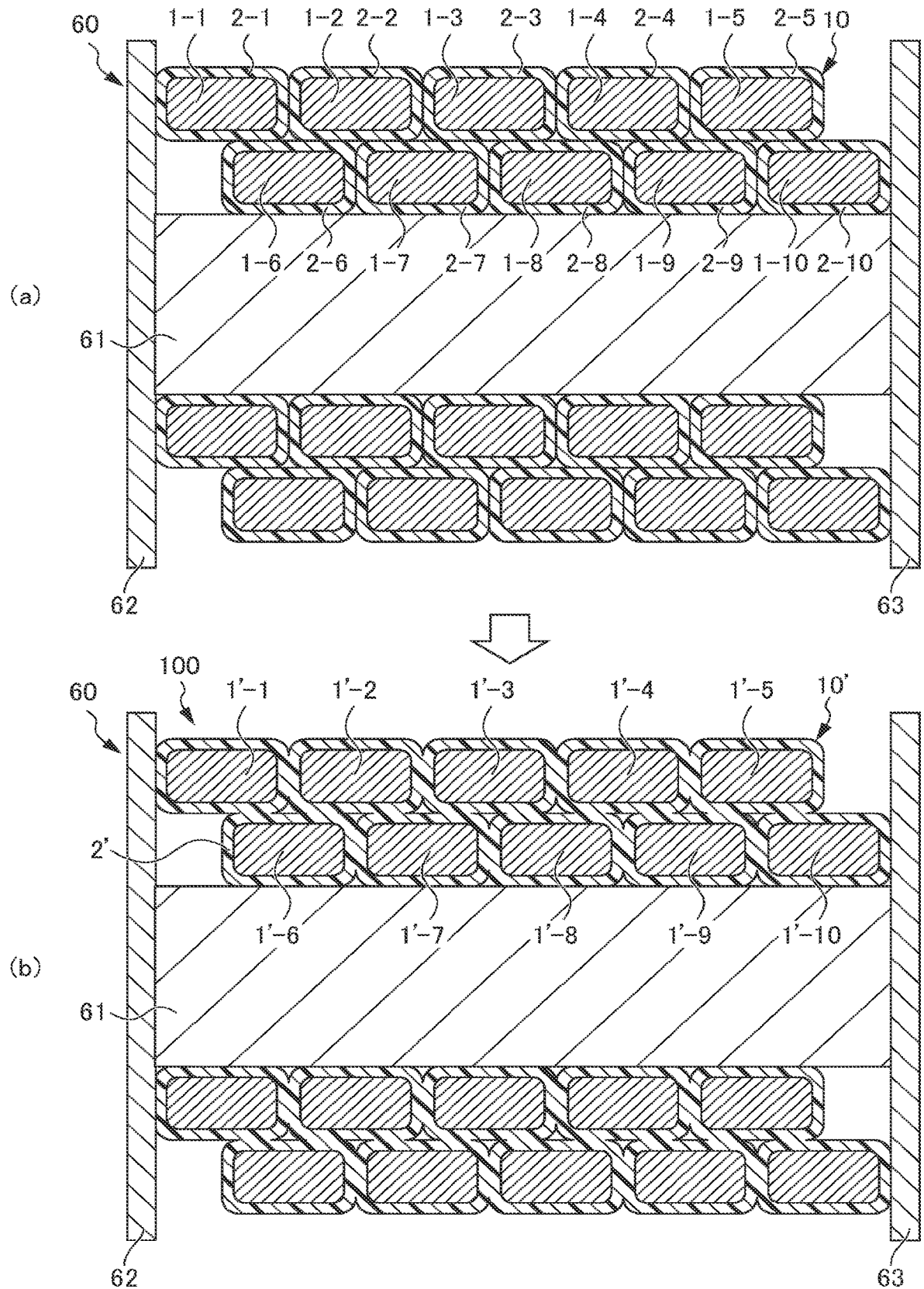
FIG. 9 is a view illustrating an example of a method for producing a superconducting coil.

The producing method will be described below with reference to FIG. 9. In the winding process, the superconducting rectangular wire 10 is spirally wound in at least two layers on the outer peripheral surface of the winding frame 60 in the substantially circumferential direction of the winding frame 60 so as to be arranged as shown in FIG. 9(a) when viewed in the cross section including the axis of the winding frame, thereby forming a coil. Next, in the heat treatment process, the coil is heated to the glass transition temperature or higher of the amorphous resin (preferably, a temperature being 30° C. higher than the glass transition temperature) and 300° C. or lower when the thermoplastic fusible resin is the amorphous resin, or heated to the melting point or higher of the crystalline resin and 300° C. or lower when the thermoplastic fusible resin is the crystalline resin, the thermoplastic fusible resins 2-1, 2-2, . . . , and 2-10 are melted and fused to each other, and as shown in FIG. 9(b), one fusible resin layer 2' is formed.

Further, a method for producing the superconducting coil shown in FIGS. 5 and 6 of the present invention includes: a winding process of forming a coil including one superconducting rectangular wire layer in which such a superconducting rectangular wire 10 described above is spirally wound on the outer peripheral surface of the winding frame 60 in a substantially circumferential direction of the winding frame 60 and the wires 1 adjacent to each other in an axial direction of the winding frame 60 are arranged side by side and separated from each other; and a heat treatment process of heating the coil formed in the winding process to a glass transition temperature or higher of an amorphous resin (preferably, a temperature being 30° C. higher than the glass transition temperature) and 300° C. or lower when the thermoplastic fusible resin is an amorphous resin, or heating the coil to a melting point or higher of a crystalline resin and 300° C. or lower when the thermoplastic fusible resin is a crystalline resin. Through such a simple method, it is possible to produce the superconducting coil 100 capable of preventing the quenching without impregnation and curing using a resin. Examples of the amorphous resin include a phenoxy resin and a polyester resin.

Figure 10:
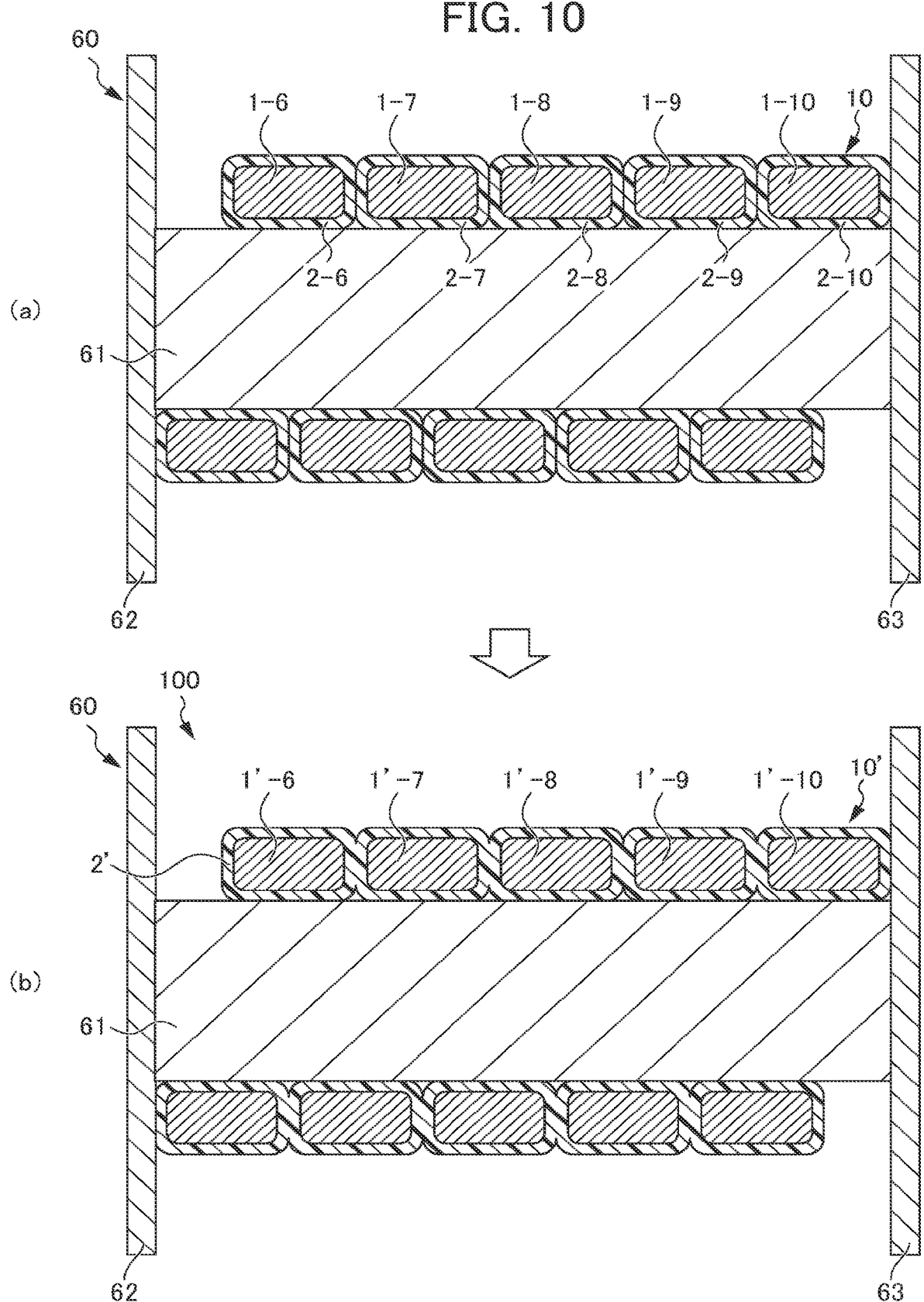
FIG. 10 is a view illustrating another example of a method for producing a superconducting coil.

The producing method will be described below with reference to FIG. 10. In the winding process, the superconducting rectangular wire 10 is spirally wound in one layer on the outer peripheral surface of the winding frame 60 in the substantially circumferential direction of the winding frame 60 so as to be arranged as shown in FIG. 10(a) when viewed in the cross section including the axis of the winding frame, thereby forming a coil. Next, in the heat treatment process, the coil is heated to the glass transition temperature or higher of the amorphous resin (preferably, a temperature being 30° C. higher than the glass transition temperature) and 300° C. or lower when the thermoplastic fusible resin is the amorphous resin, or heated to the melting point or higher of the crystalline resin and 300° C. or lower when the thermoplastic fusible resin is the crystalline resin, the thermoplastic fusible resins 2-6, 2-7, . . . , and 2-10 are melted and fused to each other, and as shown in FIG. 10(b), one fusible resin layer 2' is formed.

As a method of forming a uniform fusible resin layer, it is preferable to wind the superconducting rectangular wire 10 while applying a constant tension to the wire in the winding process.

In the heat treatment process described above, the heating temperature is 100 to 300° C., and more preferably 130 to 250° C. when the phenoxy resin is used as the thermoplastic fusible resin 2, for example. When the fusion treatment temperature is lower than 100° C., fusion treatment is required for a long time, and when the fusion treatment temperature exceeds 300° C., the performance of the superconducting wire may deteriorate due to heating, which are not preferable.

EXAMPLES

In order to further clarify the effect of the present invention, Examples and Comparative Examples will be described below, but the present invention is not limited to these Examples.

Figure 11:
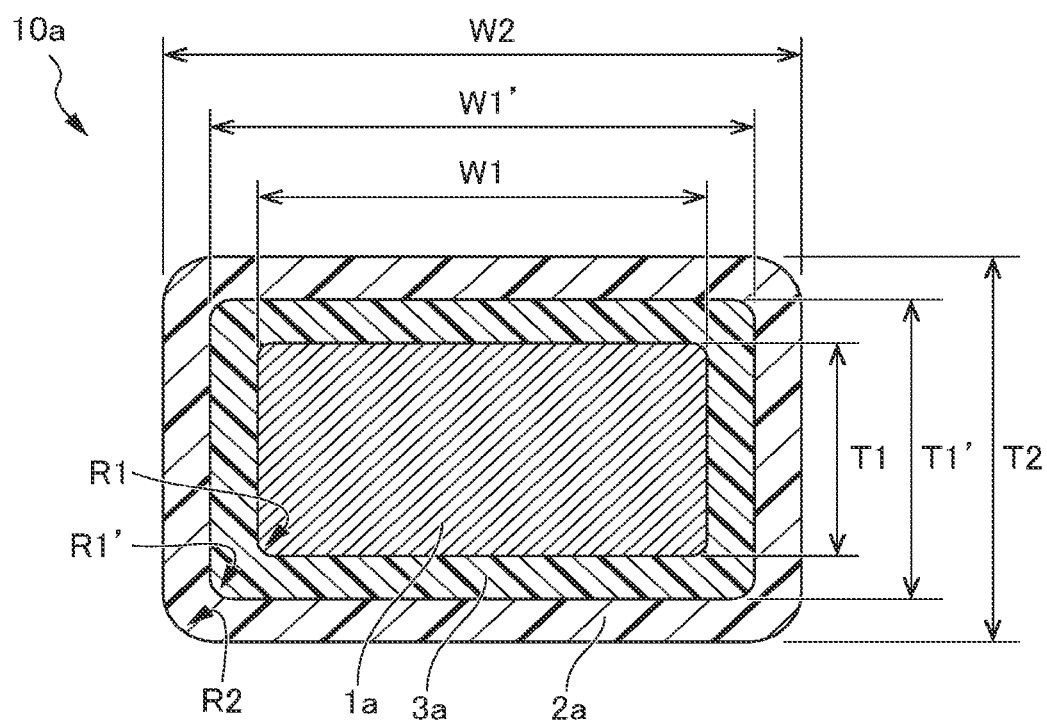
FIG. 11 is a transverse sectional view illustrating dimensions of a superconducting rectangular wire for a superconducting coil produced in Example.

Superconducting rectangular wires of Examples 1 to 6 and Comparative Examples 1 to 6 as shown in FIG. 11 were produced with the dimensions indicated in the columns of "wire", "insulating resin layer", and "fusible resin layer" in the below Table 1, using a polyamide-imide resin (Neoheat AlOOC, produced by Totoku Toryo Co., Ltd.) as an insulating resin layer on an NbTi wire whose surface is coated with copper or an copper alloy and using a phenoxy resin (YP-50, produced by Nippon Steel Chemical & Materials Co., Ltd.) as a fusible resin layer. The superconducting rectangular wire was wound in 20 layers on a winding frame made of SUS304 having a body diameter of 300 mm and a width of 500 mm, was placed in an argon atmosphere furnace, and then was heated at 200° C. for 120 minutes to obtain a superconducting coil. The dimensions of the superconducting coils of Examples 1 to 6 and Comparative Examples 1 to 6 are as indicated in Table 1 below.

Each of the superconducting coils of Examples 1 to 6 and Comparative Examples 1 to 6 was cooled with liquid helium, and was repeatedly subjected to energization (current increase rate 50 A/min.) several times up to a current achieving a design magnetic field. Table 1 below listed results of evaluating the number of training quenches until the maximum reachable magnetic field and the maximum reachable magnetic field is achieved, and the number of repetitions of heat cycle (normal temperature and 4 K) until the reachable magnetic field decreases after the maximum reachable magnetic field is achieved.

TABLE 1

| | | Example 1 | Comparative Example 1 | Example 2 | Comparative Example 2 | Example 3 | Comparative Example 3 |
|---|---|---|---|---|---|---|---|
| Wire | W1 (mm) | 1.67 | 1.67 | 1.67 | 1.67 | 2.27 | 2.27 |
| | T1 (mm) | 1.07 | 1.07 | 1.07 | 1.07 | 1.27 | 1.27 |
| | Radius of curvature R1 (mm) | 0.30 | 0.35 | 0.35 | 0.40 | 0.35 | 0.40 |
| | R1max | 0.35 | 0.35 | 0.35 | 0.35 | 0.45 | 0.45 |
| Insulating resin layer | Average coating thickness (mm) | 0.030 | 0.030 | 0.030 | 0.030 | 0.030 | 0.030 |
| | W1' (mm) | 1.73 | 1.73 | 1.73 | 1.73 | 2.33 | 2.33 |
| | T1' (mm) | 1.13 | 1.13 | 1.13 | 1.13 | 1.33 | 1.33 |
| | Radius of curvature R1' (mm) | 0.33 | 0.38 | 0.35 | 0.40 | 0.38 | 0.43 |
| Fusible resin layer | Average coating thickness (mm) | 0.035 | 0.035 | 0.035 | 0.035 | 0.035 | 0.035 |
| | W2 (mm) | 1.80 | 1.80 | 1.80 | 1.80 | 2.40 | 2.40 |
| | T2 (mm) | 1.20 | 1.20 | 1.20 | 1.20 | 1.40 | 1.40 |
| | Radius of curvature R2 (mm) | 0.37 | 0.42 | 0.35 | 0.40 | 0.42 | 0.47 |
| | R2max | 0.39 | 0.39 | 0.39 | 0.39 | 0.48 | 0.48 |
| Superconducting coil | Void ratio V1 (%) | 3.9 | 5.3 | 3.6 | 4.9 | 3.4 | 4.4 |
| | Maximum reachable magnetic field/set magnetic field (%) | 100 | 80 | 100 | 90 | 98 | 80 |
| | Number of training quenches | 0 | 7 | 1 | 6 | 1 | 10 |
| | Number of heat cycles until reachable magnetic field decreases (after training) | ∞ | 5 | ∞ | 8 | ∞ | 3 |

| | | Example 4 | Comparative Example 4 | Example 5 | Comparative Example 5 | Example 6 | Comparative Example 6 |
|---|---|---|---|---|---|---|---|
| Wire | W1 (mm) | 2.27 | 2.27 | 1.31 | 1.31 | 1.31 | 1.31 |
| | T1 (mm) | 1.27 | 1.27 | 1.11 | 1.11 | 1.11 | 1.11 |
| | Radius of curvature R1 (mm) | 0.40 | 0.45 | 0.25 | 0.30 | 0.30 | 0.35 |
| | R1max | 0.45 | 0.45 | 0.32 | 0.32 | 0.32 | 0.32 |
| Insulating resin layer | Average coating thickness (mm) | 0.030 | 0.030 | 0.020 | 0.020 | 0.020 | 0.020 |
| | W1' (mm) | 2.33 | 2.33 | 1.35 | 1.35 | 1.35 | 1.35 |
| | T1' (mm) | 1.33 | 1.33 | 1.15 | 1.15 | 1.15 | 1.15 |
| | Radius of curvature R1' (mm) | 0.40 | 0.45 | 0.27 | 0.32 | 0.30 | 0.35 |
| Fusible resin layer | Average coating thickness (mm) | 0.035 | 0.035 | 0.025 | 0.025 | 0.025 | 0.025 |
| | W2 (mm) | 2.40 | 2.40 | 1.40 | 1.40 | 1.40 | 1.40 |
| | T2 (mm) | 1.40 | 1.40 | 1.20 | 1.20 | 1.20 | 1.20 |
| | Radius of curvature R2 (mm) | 0.40 | 0.45 | 0.30 | 0.35 | 0.30 | 0.35 |
| | R2max | 0.48 | 0.48 | 0.34 | 0.34 | 0.34 | 0.34 |
| Superconducting coil | Void ratio V1 (%) | 3.1 | 4.1 | 3.1 | 4.4 | 3.2 | 4.6 |
| | Maximum reachable magnetic field/set magnetic field (%) | 100 | 90 | 100 | 95 | 100 | 85 |
| | Number of training quenches | 1 | 5 | 0 | 3 | 1 | 6 |
| | Number of heat cycles until reachable magnetic field decreases (after training) | ∞ | 10 | ∞ | ∞ | ∞ | 6 |

For Examples 7 and 8 and Comparative Examples 7 and 8, superconducting coils were produced under the same conditions as in Examples 1 to 6 and Comparative Examples 1 to 6 except that a superconducting rectangular wire with the dimensions indicated in the columns of "wire", "insulating resin layer", and "fusible resin layer" in the below Table 2 was wound on the winding frame in only one layer, and were evaluated as in Examples 1 to 6 and Comparative Examples 1 to 6.

W2 long side of superconducting rectangular wire
T1 short side of wire
T1' short side of wire coated with insulating resin
T2 short side of superconducting rectangular wire
R1 radius of curvature at corner portion of wire
R1' radius of curvature of wire coated with insulating resin
R2 radius of curvature at corner portion of superconducting rectangular wire

TABLE 2

|  |  | Example 7 | Comparative Example 7 | Example 8 | Comparative Example 8 |
|---|---|---|---|---|---|
| Wire | W1 (mm) | 1.67 | 1.67 | 1.67 | 1.67 |
|  | T1 (mm) | 1.07 | 1.07 | 1.07 | 1.07 |
|  | Radius of curvature R1 (mm) | 0.30 | 0.35 | 0.35 | 0.40 |
|  | R1max | 0.35 | 0.35 | 0.35 | 0.35 |
| Insulating resin layer | Average coating thickness (mm) | 0.030 | 0.030 | 0.030 | 0.030 |
|  | W1' (mm) | 1.73 | 1.73 | 1.73 | 1.73 |
|  | T1' (mm) | 1.13 | 1.13 | 1.13 | 1.13 |
|  | Radius of curvature R1' (mm) | 0.33 | 0.38 | 0.35 | 0.40 |
| Fusible resin layer | Average coating thickness (mm) | 0.035 | 0.035 | 0.035 | 0.035 |
|  | W2 (mm) | 1.80 | 1.80 | 1.80 | 1.80 |
|  | T2 (mm) | 1.20 | 1.20 | 1.20 | 1.20 |
|  | Radius of curvature R2 (mm) | 0.37 | 0.42 | 0.35 | 0.40 |
|  | R2max | 0.39 | 0.39 | 0.39 | 0.39 |
| Superconducting coil | Void ratio V1 (%) | 3.9 | 5.3 | 3.6 | 4.9 |
|  | Maximum reachable magnetic field/set magnetic field (%) | 98 | 79 | 95 | 85 |
|  | Number of training quenches | 1 | 8 | 1 | 7 |
|  | Number of heat cycles until reachable magnetic field decreases (after training) | ∞ | 4 | ∞ | 6 |

EXPLANATION OF REFERENCE NUMERALS

1, 1' wire
1'-1 to 1'-10, 1a'-1 to 1a'-10, 1b'-1 to 1b'-10 specific part of wire
10, 10' superconducting rectangular wire
100 superconducting coil
2, 2-1 to 2-10 fusible resin layer
2', 2a', 2b' thermoplastic fusible resin or fusible resin layer
3a insulating resin layer
41 to 47, 41b to 44b, 51, 52 void
60 winding frame
61 barrel portion of winding frame
61a outer peripheral line of barrel portion of winding frame
62, 63 brim portion of winding frame
71 inner side void
72 outer side void
L1, L2, L1b, L2b superconducting rectangular wire layer
S1, S2 separated section
W1 long side of wire
W1' long side of wire coated with insulating resin

The invention claimed is:
1. A superconducting coil comprising:
   a winding frame; and
   at least two superconducting rectangular wire layers provided in such a manner that a superconducting rectangular wire is spirally wound on an outer peripheral surface of the winding frame in a substantially circumferential direction of the winding frame such that wires adjacent to each other in an axial direction of the winding frame are arranged side by side and separated from each other, the superconducting rectangular wire including an NbTi-based or Nb3Sn-based wire having a surface coated with copper or copper alloy and having a substantially rectangular cross-section, wherein
   at least a thermoplastic fusible resin is provided in a separated section between the adjacent wires in the same superconducting rectangular wire layer and provided in a separated section between the adjacent wires that are located respectively in the two superconducting rectangular wire layers adjacent to each other, and
   when viewed in a cross section including an axis of the winding frame, at least one of voids that are partition- able on outer surfaces of a total of three superconducting rectangular wires and are partitionable on outer surfaces of a total of four superconducting rectangular wires located on the two adjacent superconducting rectangular wire layers and adjacent to each other are 4% or less in terms of a void ratio (V1), which is an area ratio of the voids occupying the at least two superconducting rectangular wire layers.

2. The superconducting coil according to claim 1, wherein the voids are partitioned on the outer surfaces of a total of three and a total of four superconducting rectangular wires located on the two adjacent superconducting rectangular wire layers and adjacent to each other when viewed in the cross section including the axis of the winding frame.

3. The superconducting coil according to claim 1, wherein the superconducting rectangular wire includes a fusible resin layer made of the thermoplastic fusible resin that coats an outer peripheral surface of the wire.

4. The superconducting coil according to claim 3, wherein the superconducting rectangular wire further includes an insulating resin layer between the outer peripheral surface of the wire and the fusible resin layer.

5. The superconducting coil according to claim 4, wherein the insulating resin layer is made of one or more selected from a polyvinyl formal resin, a polyamide-imide resin, a polyimide resin, a polyester resin, and a polyurethane resin.

6. The superconducting coil according to claim 4, wherein an average coating thickness of the insulating resin layer is 0.005 mm or more and 0.100 mm or less.

7. The superconducting coil according to claim 1, wherein the thermoplastic fusible resin is made of one or more selected from a phenoxy resin, a polyamide resin, and a polyester resin.

8. The superconducting coil according to claim 1, wherein the wire is a rectangular wire, and a radius of curvature (R1) at a corner portion of the wire is 0.1 mm or more and 0.4 mm or less.

9. The superconducting coil according to claim 1, wherein the wire is a rectangular wire, and a radius of curvature (R1) at a corner portion of the wire satisfies Expression (1) and Expression (2) indicated below;

[Math. 1]

$$0 < R1 \leq R1_{max} \quad \text{Expression (1)}$$

$$R1_{max} [\text{mm}] = \sqrt{A \times \frac{(\text{Cross-sectional width of wire}) \times (\text{Cross-sectional thickness of wire})}{4 - \pi}} \quad \text{Expression (2)}$$

A is 0.06 in Expression (2).

10. The superconducting rectangular wire according to claim 9, further comprising an insulating resin layer made of an insulating resin between the outer peripheral surface of the wire and the fusible resin layer.

11. The superconducting rectangular wire according to claim 10, wherein the insulating resin is made of one or more selected from a polyvinyl formal resin, a polyamide-imide resin, a polyimide resin, a polyester resin, and a polyurethane resin.

12. The superconducting rectangular wire according to claim 10, wherein an average coating thickness of the insulating resin layer is 0.005 mm or more and 0.100 mm or less.

13. A method for producing a superconducting coil, the method comprising:
a winding process of forming a coil including at least two superconducting rectangular wire layers in which the superconducting rectangular wire according to claim 11 is spirally wound on an outer peripheral surface of a winding frame in a substantially circumferential direction of the winding frame and wires adjacent to each other in an axial direction of the winding frame are arranged side by side and separated from each other; and
a heat treatment process of heating, when the thermoplastic fusible resin is an amorphous resin, the coil formed in the winding process to a glass transition temperature or higher of the amorphous resin and 300° C. or lower, or heating, when the thermoplastic fusible resin is a crystalline resin, the coil to a melting point or higher of the crystalline resin and 300° C. or lower.

14. A method for producing a superconducting coil, the method comprising:
a winding process of forming a coil including one superconducting rectangular wire layer in which the superconducting rectangular wire according to claim 11 is spirally wound on an outer peripheral surface of a winding frame in a substantially circumferential direction of the winding frame and wires adjacent to each other in an axial direction of the winding frame are arranged side by side and separated from each other; and
a heat treatment process of heating, when the thermoplastic fusible resin is an amorphous resin, the coil formed in the winding process to a glass transition temperature or higher of the amorphous resin and 300° C. or lower, or heating, when the thermoplastic fusible resin is a crystalline resin, the coil to a melting point or higher of the crystalline resin and 300° C. or lower.

15. A superconducting coil comprising:
a winding frame; and
one superconducting rectangular wire layer provided in such a manner that a superconducting rectangular wire is spirally wound on an outer peripheral surface of the winding frame in a substantially circumferential direction of the winding frame such that wires adjacent to each other in an axial direction of the winding frame are arranged side by side and separated from each other, the superconducting rectangular wire including an NbTi-based or $Nb_3Sn$-based wire having a surface coated with copper or copper alloy and having a substantially rectangular cross-section, wherein
at least a thermoplastic fusible resin is provided in a separated section between the adjacent wires in the superconducting rectangular wire layer, and
when viewed in a cross section including an axis of the winding frame, voids that are partitionable on outer surfaces of a total of two superconducting rectangular wires adjacent to each other are 4% or less in terms of a void ratio (V1), which is an area ratio of the voids occupying the superconducting rectangular wire layer.

16. A superconducting rectangular wire comprising:
an NbTi-based or $Nb_3Sn$-based wire having a surface coated with copper or copper alloy; and
a fusible resin layer made of a thermoplastic fusible resin that coats an outer peripheral surface of the wire, wherein
an average coating thickness of the fusible resin layer is 0.005 mm or more and 0.100 mm or less, and
a radius of curvature (R2) at a corner portion of the superconducting rectangular wire satisfies Expression (3) and Expression (4) indicated below;

[Math. 2]

$$0 < R2 \leq R2_{max} \quad \text{Expression (3)}$$

$$R2_{max}[\text{mm}] = \sqrt{B \times \frac{(\text{Cross-sectional width of superconducting rectangular wire}) \times (\text{Cross-sectional thickness of superconducting rectangular wire})}{4 - \pi}} \quad \text{Expression (4)}$$

B is 0.06 in Expression (4).

17. The superconducting rectangular wire according to claim 16, wherein the average coating thickness of the fusible resin layer is 0.01 mm or more and 0.07mm or less.

18. The superconducting rectangular wire according to claim 16, wherein the thermoplastic fusible resin is made of one or more selected from a phenoxy resin, a polyamide resin, and a polyester resin.

19. The superconducting rectangular wire according to claim 11, wherein the wire is a rectangular wire, and a radius of curvature (R1) at a corner portion of the wire is 0.1 mm or more and 0.4 mm or less.

20. The superconducting rectangular wire according to claim 16, wherein the wire is a rectangular wire, and a radius of curvature (R1) at a corner portion of the wire satisfies Expression (1) and Expression (2) indicated below;

[Math. 3]

$$0 < R1 \leq R1_{max} \quad \text{Expression (1)}$$

$$R1_{max}[\text{mm}] = \sqrt{A \times \frac{(\text{Cross-sectional width of wire}) \times (\text{Cross-sectional thickness of wire})}{4 - \pi}} \quad \text{Expression (2)}$$

A is 0.06 in Expression (2).

* * * * *